United States Patent
Perin et al.

(10) Patent No.: US 6,275,474 B1
(45) Date of Patent: Aug. 14, 2001

(54) PRIVATE DIGITAL COMMUNICATION APPARATUS FOR INTERCONNECTING A PLURALITY OF ELEMENTS

(75) Inventors: Franco Perin, Milan; Fulco Muriglio, Rho, both of (IT)

(73) Assignee: Alcatel, Paris (FR)

(*) Notice: Subject to any disclaimer, the term of this patent is extended or adjusted under 35 U.S.C. 154(b) by 0 days.

(21) Appl. No.: 08/779,289

(22) Filed: Jan. 17, 1997

(30) Foreign Application Priority Data

Jan. 17, 1996 (IT) .............................. MI96A0065

(51) Int. Cl.[7] .................................................. H04L 12/16
(52) U.S. Cl. ............................................ 370/266; 370/437
(58) Field of Search .................................. 370/442, 447, 370/461, 462, 423, 426, 420, 421, 438, 439, 437, 263, 266, 267, 268; 340/825.06, 825.07, 825.5; 379/203

(56) References Cited

U.S. PATENT DOCUMENTS

| | | | |
|---|---|---|---|
| 3,958,084 | * | 5/1976 | Nicholas . |
| 4,289,932 | * | 9/1981 | Reed ..................................... 370/268 |
| 4,516,240 | * | 5/1985 | Kume et al. ........................... 370/85 |
| 4,797,876 | * | 1/1989 | Ratcliff ................................. 370/261 |
| 5,124,983 | * | 6/1992 | Landez et al. ........................ 370/353 |
| 5,425,022 | * | 6/1995 | Clark et al. .......................... 370/58.3 |

* cited by examiner

Primary Examiner—Chau Nguyen
Assistant Examiner—Alexander O. Boakye

(57) ABSTRACT

The invention relates to a private digital communication apparatus for interconnecting a plurality of interface modules which communicate through a common bus. In particular, it concerns a multipoint apparatus which uses a two-wire cable as a bus, and the access to the bus is carried out through the time multiplex technique (TDMA).

12 Claims, 5 Drawing Sheets

TWx + TWy → LOC

TWxy + LOC → PCx
TWxy + PCx → LOC

TWx + TWy → PCx

PRIVATE DIGITAL COMMUNICATION APPARATUS FOR INTERCONNECTING A PLURALITY OF ELEMENTS

BACKGROUND OF THE INVENTION

1. Field of the Invention

The present invention relates to a private digital communication apparatus for interconnecting a plurality of interface modules which communicate through a common bus.

2. Description of the Related Art

Apparatus of the type just described above are already known in the literature.

SUMMARY OF THE INVENTION

An object of the present invention is to give a further contribution to this field by providing further improvements in the performances of the apparatus mentioned above, in a particularly simple manner.

Another object of the present invention is so to design an apparatus of the type mentioned above as to be compact, easy to realize and low cost.

According to a first aspect of the present invention, a private digital communication apparatus comprises a plurality of interface modules for communicating through a common bus, means for managing the access of the interface modules to the common bus, the access management means being partially distributed in each of the interface modules.

In further accord with this first aspect of the present invention, each of the interface modules may become a master manager of the bus.

According further to this first aspect of the present invention, the common bus may be a bidirectional two-wire bus.

In still further accord with this first aspect of the present invention, access to the common bus may be carried out through time-division multiplexing.

Still further in accord with this first aspect of the present invention, the interface modules may have a pulse code modulation (PCM) interface in order to be able to make outside connections.

In accordance still further with this first aspect of the present invention, the interface modules each comprise a line interface connected to the common bus, a PCM interface, a switching module connected to the line interface and to the PCM interface, an access control module for driving the line interface, a microprocessor for driving the switching module, the PCM interface and the access control module. Additionally, a watchdog module may be included for connection to the bus and be driven by the microprocessor.

According to a second aspect of the present invention, an integrated circuit comprises a line interface connected to a bus, a PCM interface, a switching module connected to the line interface and to the PCM interface, and an access control module driving the line interface.

Advantageously, according to the invention the handling of the access has been partially distributed in each of the interface modules connected to the bus. Despite this, all the modules are similar to each other. This particularly simplifies the construction of these modules.

Each of the modules present on the bus may become the bus master manager. According to the situation of the connections present at a given instant and according to the rules established by the access manager (distributed among the various modules) it is decided who is the master module.

Such apparatus is of multipoint type, uses a two-wire cable as a bus and the access to the bus is carried out through the time division (TDMA) technique.

The various interface modules have a PCM connection to be able to be connected with the outside, i.e. it is possible to connect telephone sets, to establish connections to external public lines and to various services such as telefax, minitel, computers, printers, etc., and to whatever else has a PCM interface and is outside the private digital communication apparatus of the invention. In this way the modularity of the apparatus is maximum, different peripheral apparatuses can be connected to the same interface modules.

Therefore, special care has been taken in the realization of these interface modules to be able to manage in common mode, without obstacles, the access to the bus, still maintaining a particularly compact realization so as to be feasible through an integrated circuit type ASIC (apart from the microprocessor, of course).

A private digital communication apparatus has thus been obtained which is: able to connect quite a number of terminal apparatuses, extremely versatile, highly modular, of compact dimension, without a unique manager (and therefore a further apparatus) for the access to the bus.

These and other objects, features and advantages of the present invention will become more apparent in light of the detailed description of a best mode embodiment thereof, as illustrated in the accompanying drawing.

DESCRIPTION OF THE PREFERRED EMBODIMENT

The communication system at issue is a multipoint one, it uses a two-wire cable as a bus and the access to the bus is carried out through the time division multiple access technique (TDMA).

Figure 1:
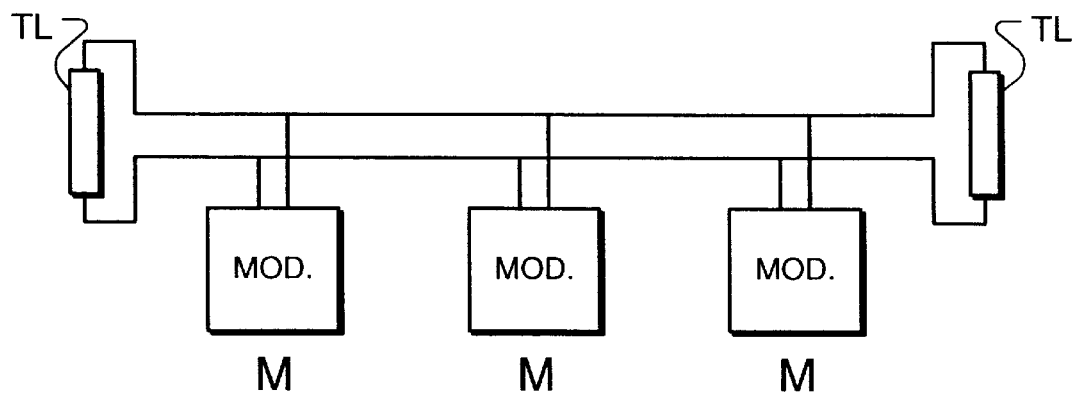
FIG. 1 is a schematic representation of the whole apparatus composed of the interface modules connected to the bus.

According to an embodiment of the invention, as can be seen from FIG. 1, the bus comprehensive of the line terminations TL, is 200 m long at most, and the connections to the bus of each interface module M must not exceed 5 m. The maximum number of interface modules M that can be connected to the bus is 1 2.

Different terminal elements can be connected to the interface modules M. In an embodiment of the invention eight telephone sets can be connected, of which two at the most, can be connected to external public lines, and four further interfaces at the most can be connected for various services such as telefax, minitel, computers, printers.

The access to common bus control is carried out through the time division technique TDMA. From FIG. 2 it can be seen that the frame structure is formed by one synchronization channel SYNC, one channel SIG for signalization and ten channels Ch1 to Ch10.

Figure 2:
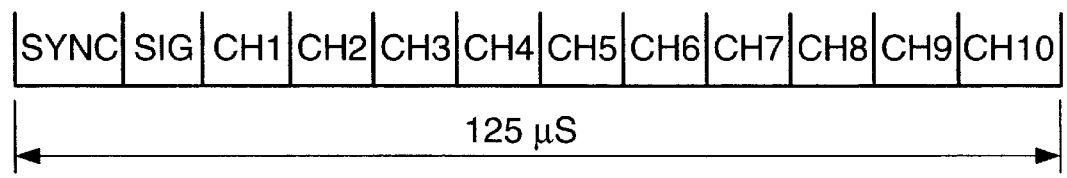
FIG. 2 represents the frame structure.

FIG. 2 shows the frame structure when transmitted by the master module. The master module will normally be a module which is synchronized by the external telephone network. The other modules should transmit in the channels while observing the bus propagation times.

For a 200 m bus, the propagation delay should be 1,4 us at most, for the modules located at the ends of the cable. In this case also the answer will be received after further 1.4 us. Therefore, it is necessary a delay of at least 2.8 us as guard time between the channels. A further 1 us has been added as a margin against eventual jitter and distortion problems and to easy the synchronization of the channels. Since the distance between the modules is quite short as compared with the speed used, the choice of the line code is not determined by the crosstalk signal-to-noise ratio or by the distortion of the cable attenuation, but rather by the intersymbol interference caused by the line reflections. These reflections are caused by the capacity of the connection cables of the interface modules and by the interfaces connected along the bus.

The reflection worst case occurs when the bus has a higher impedance than the capacitive load of the connection cables of the modules.

The distortion worst case, introduced by these reflections, occurs when the bus attenuation is low and the propagation time is long. In this case the reflections go back to the transmitter with a minimal attenuation.

The line code has been chosen for minimizing the influence of these reflections; moreover, it must not have the DC component in order to facilitate and use the transformer coupling.

These considerations lead to the choice of the biphase two-level code termed Manchester. This line code has no DC components and has a receive comparator independent of the received signal attenuation.

Such code is not sensitive to the polarity, hence each module must align the polarity of its transmitted and received symbols with the polarity of the alignment frame transmitted by the master module.

Figure 3:
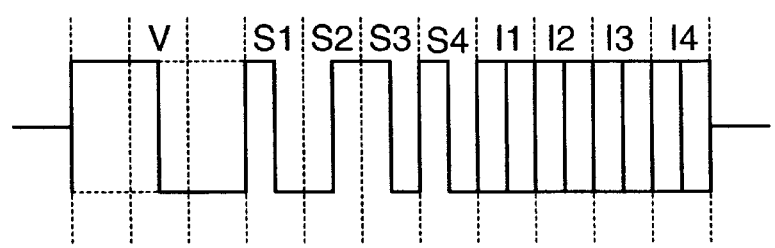
FIG. 3 shows the synchronization word SYNC in detail.

The synchronization word SYNC is shown in detail in FIG. 3. The first part of this time interval is without signal followed by a code violation V which is used by the receiver for recognizing the time reference located at the center of the violation itself. This time reference is used by the frame clock extraction mechanism. The code violation is inverted every frame to induce the introduced low-frequency jitter.

The four symbols S1 a S4 are used by the receive module to check that the correct synchronization has been reached. Moreover, they are used by the receiver in a slave manner to determine the polarity with which the transmitter shall transmit and receive on the bus. The polarity with which the slave module transmits and receives on the bus is referred to the polarity of the alignment frame received by the master module. The last four symbols I1 to I4 contain the address of the module authorized to use the signaling channel.

Figure 4:
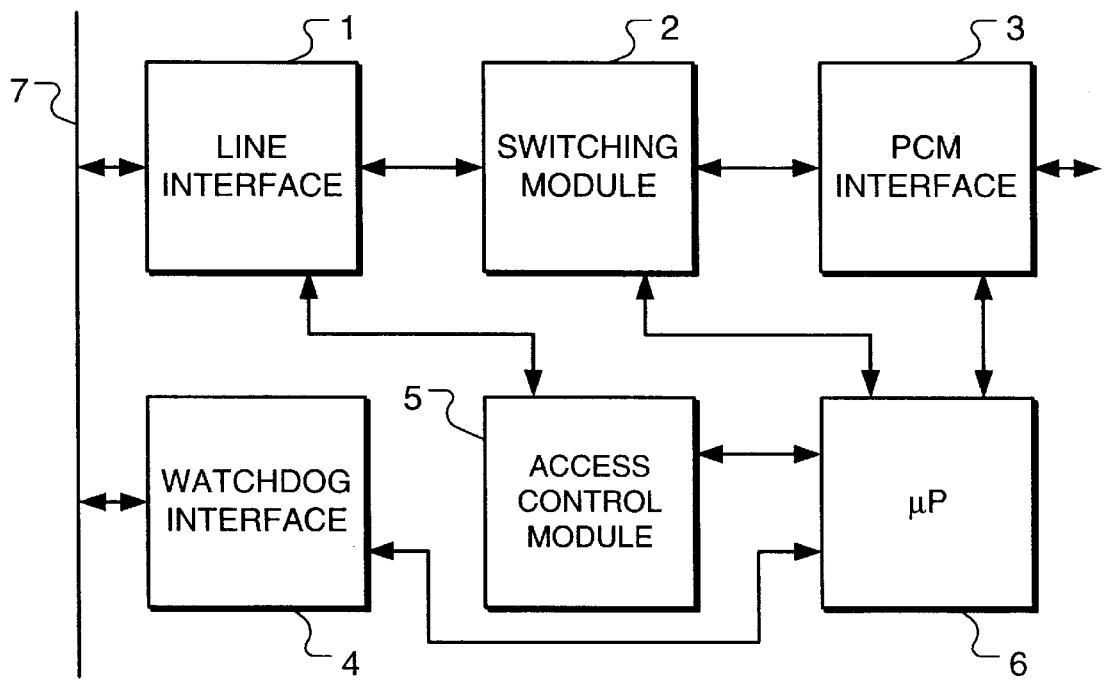
FIG. 4 is a block diagram of an interface module.

The block diagram of the interface module is represented in FIG. 4. It is formed by the following blocks:

A line interface 1 connected to bus 7, a PCM interface 3 which is the connection of the module to the outside. It is possible to connect to the latter local telephones, external telephone lines, various devices such as printers, fax, computers, etc., and any other terminal capable of communicating in PCM;

A switching module 2, connected to the line interface 1 and to the PCM interface 3, is used for sorting communications from and to the two aforesaid interfaces;

An access control module 5 for driving and controlling the line interface 1 and hence the access to bus 7; and, lastly, A microprocessor 6 for driving the switching module 2, the PCM interface 3 and the access control module 5.

It is possible to add a watch-dog module 4, connected to the bus 7 and driven by microprocessor 6 to avoid eventual blocking of the entire apparatus.

The above blocks will now be described in greater detail.

The line interface 1 is coupled with bus 7 through a transformer and establishes the connections between the various modules by using the channels preset as described previously.

The PCM interface 3 handles the incoming and outgoing data and the related clocks. It also carries out the serial-to-parallel and parallel-to-serial conversions for the connections with the switching module 2. Such interface is able to handle both conventional telephone accesses, such as the analog ones, and the ISDN terminals.

In the first case, synchronization with the outside cannot occur. In the second case, being possible to have two terminals of this type connected to the bus, one of them will make the relative interface module become the master module, whilst the other one will be slave.

The master ISDN device will provide the clock from the ISDN connection when it will be active while it will provide the clock from a local free oscillator (PLL) when the ISDN connection will not be active. The clock thus provided, will be the synchronization clock of the bus 7.

The ISDN terminal is slave when another ISDN terminal has an active ISDN connection. In this case the local oscillator will generate a clock synchronized with the clock provided by the other active ISDN connection.

When the slave module becomes master (i.e. when its ISDN connection becomes active or when it is active and the master connection ends in) the clock generated by it will result very close in phase to the master one so as to assure that the change of the synchronization source does not penalize the other terminals and the communication in progress. To do so one must be sure that the interface modules dedicated to the ISDN terminals have their connections to bus 7 close enough so that the propagation delay towards the other terminals is quite the same.

To be noted that there are other constraints on the assignments of the internal resources to the PCM channels on account of the structure of the switching module 2 which will be seen later on. The first four channels of the PCM frame are used: the first two for the waiting signal and the local code, and the next two for the ISDN channel or two voice channels from analog network.

The access control module 5 is responsible for the interpretation of the information of the line interface 1 relative to the connection status and it consequently reacts taking account also of the directives provided by microprocessor 6. It communicates with microprocessor 6 through interrupts and registers. Such module must be able to provide the apparatus with the following performances:

It must keep the system in a stable state. One of the devices shall continuously provide bus 7 with a synchronization signal every 125 microseconds until configuration changes in the system occur.

It must be able to connect and configure new devices during normal operation of the apparatus without interruptions and with the minimum disturbance. This includes: the lock of the interface module with the synchronization frame; the possible change of the synchronization source if the new device has to provide correctly its functions in the shortest possible time, and an installation time as short as possible so that it can immediately come into operation without blocking the system for an excessive period of time.

It must assure that in the case of simultaneous installation of some or all the devices, only one is preset as synchronization source; and also in the case where two devices are preset as synchronization sources, make sure that the coexistence time of two synchronization sources is as short as possible and the system restores the correct configuration quickly.

It must provide a safe method of disconnecting a device disturbing the system as little as possible; also when the device to be installed is the one preset as a synchronism source.

Besides these features, the access control module 5 must also handle the signaling channel.

At this point assume that the circuit which handles the physical level of the system carries out its job fairly and the synchronization losses are rare events. The behaviour of the access control module 5 can be summarized as follows also referring to the features listed above.

A device which was not synchronism source and losses the synchronization is not allowed to become immediately synchronism source. As long as there is energy in the connection, it will try to synchronize itself again. Should the connection be interrupted (i.e. when there is no longer energy on the connection) it waits some instants and tries to become a synchronism source.

A synchronism source that notes a disturbance in the synchronization frame will become active by sending the synchronization word, but it will not send data over the channel. It will remain active as long as the other peripheral units have recovered the synchronization losses (i.e. as long as the signaling channel is used as before): in this circumstance the communications existing before the disturbance are recovered (if the microprocessor has not already erased the associated register). If, after a prefixed waiting time, the system has not recovered, the microprocessor will order the access control module to preset itself to an inactive state. At this point the interface module will not transmit any more and the frame structure will break off. Then the system starts again to operate as described previously.

When a device is a synchronization source, the microprocessor makes sure that it recognizes the responses to the signaling requests from the other devices. If such responses do not arrive during a prefixed time interval, the microprocessor will again order the access control module to preset itself to an inactive state (considering that there is the probability that serious question exists, or that the device has not been installed). It will try again to become a synchronization source in response to an external event (handset hook-off, external telephone connection activated, other users requests).

When a connection goes dead, the restore starts with with one or more devices which transmit energy (each device transmits a different sequence) after a guard time and with a period of transmission followed by a silent period during which it recognizes that the other devices are transmitting. The guard and transmission times are different for each interface module, depending on their identification number in the system.

The signaling channel access is managed via software. The synchronism source module sends an authorization number with the synchronization word which communicates to the other modules who accesses the signaling channel. The manner in which the various modules are called in, is handled by the software. The access control module 5 hence handles only the processes of the tentatives of the various interface modules to become synchronization sources. The lock of the interface modules to the frame already present on the bus is handled by the line interface 1.

Figure 5:
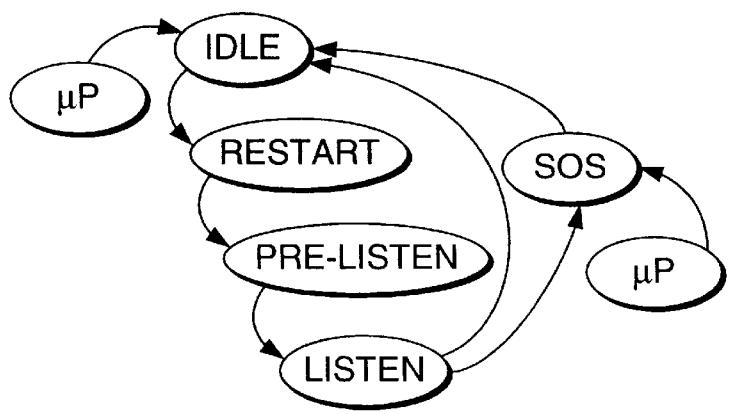
FIG. 5 represents the states of an access control module.

Referring now to FIG. 5, there are summerized therein the states of the access control modules.

The microprocessor forces the module into the inactive IDLE state; if there is no energy during a waiting time one passes into RESTART state. After the duration of the RESTART state, one passes into PRE-LISTEN state which is needed by the module to wait until the energy transmitted over the bus 7 becomes attenuated. Then one passes into the LISTEN state in which the module is in stand-by for some instants. If there is energy on the bus during this very short time, one passes again into the IDLE state otherwise one passes into the SOS state, i.e. synchronization source, to which one can access also via software; if there are remarkable disturbances one passes again into the IDLE state.

The access control module 5 is seen by microprocessor 6 as a series of registers and an interrupts source. The use of the frame resources over the bus 7 is defined by the occupancy of the different channels and by other predications on the status of the connection.

If not otherwise specified, the active level of all the bits is 1. The registers associated with the status of the bus are three read only registers of 8 bits B0–B7.

TABLE 1

| | B7 | B6 | B5 | B4 | B3 | B2 | B1 | B0 |
|---|---|---|---|---|---|---|---|---|
| STAT1 | SYN | SIG | CH1 | CH2 | CH3 | CH4 | CH5 | CH6 |
| STAT2 | CH7 | CH8 | CH9 | CH10 | | | | |
| SYS | NRG | SYNCLOSS | | | | MST2 | MST1 | MST0 |

The registers STAT1 and STAT2 show which channels contain data (local energy recognition). Register SYS contains information about the bus management.

Bit NRG shows if there is energy on the bus. SYNCLOSS indicates if the slave module is locked to the frame. When the module is synchronization source, it recognizes if there is a disturbance on the frame. To be noted that a 0 value, in this case, is not equivalent to a lack of disturbance. In this circumstance, it must be recognized at a higher level by recognizing a wrong value on transferred data.

MST2–0 indicates the state of the access control module. Such states can be: inactive state, availing or guard state and synchronization source state.

It is possible to mask the interrupts generated by the observation of the connections in a simple manner: STAT1, STAT2 and SYS have their equivalents in the register of the maskings.

TABLE 2

| | B7 | B6 | B5 | B4 | B3 | B2 | B1 | B0 |
|---|---|---|---|---|---|---|---|---|
| MST1 | | SIG | CH1 | CH2 | CH3 | CH4 | CH5 | CH6 |
| MST2 | CH7 | CH8 | CH9 | CH10 | | | | |
| MSYS | NRG | SYNCLOSS | | | | | | MST |

Writing into one of these registers (initial state after a reset) means that a change in the corresponding register will not generate an interrupt. The content of the information contained in the register about the state of the bus will not be changed by the values written in the other register. Any change in the unmasked bits of STAT1 and STAT2 will be signalled to microprocessor 6 through an interrupt, another interrupt being used for MSYS.

Bit B7 of the register STAT1 cannot be masked since it does not generate interrupts. It gives information about the presence of energy in the time interval relative to the synchronism word. It is meaningless when SYNCLOSS is equal to 1, like also for any bit in the registers STAT1 and STAT2. This information should not be used except for switching an ISDN synchronism source.

The microprocessor 6 drives the behaviour of the access control module of the priority of devices and of the synchronism sources through a command register T1. The microprocessor may force it into the IDLE state by setting B7 of T1 equal to 1, in the SOS state by setting B6 to 1, or may force it to try to become SOS (RESTART) by positioning 1 to bits B6 and B7. Moreover, it may force it to take an external synchronism to synchronize its PLL by setting B5 equal to 1. The other bits of register T1 are used for identifying the module and its priority.

The signaling channel is handled with the help of a simple register and an interrupt. When the interface module is in the SOS state, it decides which module on the bus is allowed to access the signaling channel. This is done by the microprocessor through a programmable register.

TABLE 3

|  | B3 | B2 | B1 | B0 |
| --- | --- | --- | --- | --- |
| SIGC | SIGC3 | SIGC2 | SIGC1 | SIGC0 |

The content of this register is updated by the microprocessor 6 of the master module.

The access control module 5 compares the signalling authorization number acquired by the line interface 1 and advises the microprocessor 6 when the signalling channel is proper, i.e. in the case where the number is in accord with its identification number.

It is important to make sure that the modules of the system are all numbered with a different identification number. When a system is installed, before choosing an SOS, there is no means to make sure that the number is correct. When a new device is added, the proposed number (formed by the user) can be compared with the existing ones to avoid generation problems.

In case of failure, it is recommended that the configuration of the system is saved in all modules so that the restore of the system is automatic.

The arbitration for the priority of the synchronization is carried out by a mix of hardware and software. The line interface 1 handles the synchronization of the slave modules, the access control module 5 handles the process of tentatives of the interface modules to become synchronization sources and the software handles the remainder.

As to the hardware, when a module is in the IDLE state, it remains in this state as long as energy exists on the connection (so that a valid frame is not disturbed by a device which is not synchronized).

One passes from the LISTEN state to the IDLE state on the ground of the existence of energy after the device has ceased to transmit (the solution to the priority problem when different devices become simultaneously active).

The different hardware-implemented guard times are made in such a way that the least number of terminals enter simultaneously into the RESTART state, and that only one of them becomes SOS.

The numbering of modules provides unique values for these times. The time necessary for a slave module to become SOS, when the master drops or is removed from the system, is less than 32 milliseconds and depends on the smallest number given to one of the operating modules (the smaller this number, the shorter the time). If the programming has not changed in the meanwhile, the communications are automatically reactivated.

As to the software, the local processor decides when enabling the passage of the access control module 5 from the IDLE state to the RESTART state if all the automatic tentatives are unsuccessful.

The state of the machine can be switched directly to the SOS state by the microprocessor 6. This function should never be used save for changing the SOS module at once (soft switching for ISDN sources).

The state of the machine can also be directly switched into RESTART state by microprocessor 6. This function is used for easily doing a test of the system by creating a disturbance on the bus. It should never be used in the final software of use.

The microprocessor 6 switches from the SOS state into the IDLE state when it senses the absence of energy in the signalling channel during a waiting time.

The microprocessor 6 of the SOS module determines who accesses the signalling channel (through programming of the SIGC register).

The switching module 2 is the hardware resource used for running from and toward the PCM interface 3 and the line interface 1.

Its structure is full parallel: the registers necessary for the parallel-to-serial conversion and viceversa form parts of the PCM interface 3 and line interface 1.

Its synchronization is determined by the fact that a single clock drives the interfaces: there are no synchronism problems between the PCM interface 3, the line interface 1 and the switching interface 2.

This module 2 shall store data from the PCM interface 3 into a buffer called PCM buffer. The buffer must be able to handle up to four different channels: one is preset for the insertion of a waiting music, another one is dedicated to local codec.

The two remaining channels are dedicated to the interface with two telephone lines. For the sake of simplicity these four channels are fixed and are the first four channels of the PCM frame. Each channel has a dedicated register.

It must further provide the line interface 1 with data from PCM buffer and with signalling and data from microprocessor 6. Therefore, a buffer for signalling is added to the PCM buffer. The microprocessor 6 accesses the register associated with the local codec for handling the hand-free functions. These registers are multiplexed on bus 7.

It shall further store data from the PCM interface 3 and from the line interface 1 into a buffer called TWIN buffer. This buffer must be able to handle up to three different channels: one is dedicated to local codec, the two remaining channels are dedicated to the telephone lines. The microprocessor 6 accesses the register associated with the local codec for the hands-free functions.

It must provide the PCM interface 3 with data from the TWIN buffer or by microprocessor 6, and obtain signalling from the line interface 1. The three registers of the TWIN buffer are multiplexed on the PCM interface 3.

It must carry out the arithmetic operations required by the conference function, through an adder. The results of the summations are never sent to the line interface 1. Each interface module carries out sums only over channels towards the local codec or towards the local line interfaces. This means that only three operations for frame are to be carried out. A sub-module containing the necessary expanders, adders and compressors is responsible for these operations.

Every combination of operations to be carried out by the switching module will now be analyzed in detail, covering all possible functions by using an example for each of them.

The PCM interface 3 has separable resources for the input and the output. Therefore, for a PCM channel, only one number is used for addressing a bidirectional channel: LOC for the local codec and PCx for the external telephone interface.

The line interface 1 has shared resources for the input and the output. Therefore, two channels are necessary fort establishing a bidirectional channel (TWx e TWy). In the case of a conference three bus channels (TWx and TWy from two remote interface modules and TWxy from the local phone) are used.

The following limitations exist: it is not possible to establish more than one conference at a time; none of the elements of a conference can be copied as an individual channel on another.

In FIGS. 6a–i there are represented the TWIN buffer 11 and the PCM buffer 14. Elements 12 and 13 are used for adding and switching the lines.

Figure 6A:
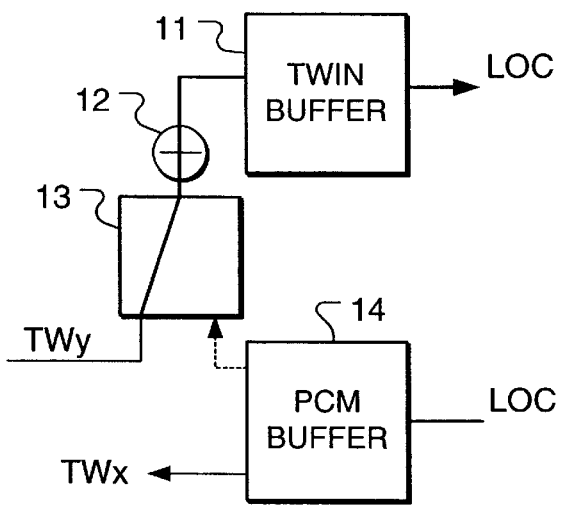
FIGS. 6a to 6i represent all the combinations of operations that must be carried out by the switching module.

FIG. 6a represents a simple communication between the local module and a module on the bus (twvo channels are used).

Figure 6B:
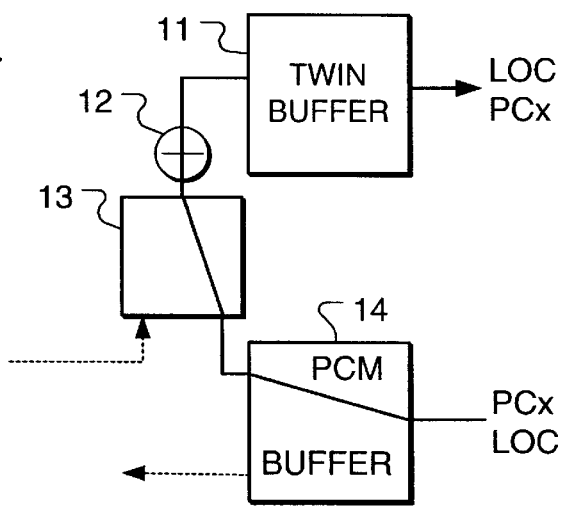

FIG. 6b represents a simple communication between the local module and an external telephone line (no channels are used on the bus).

Figure 6C:
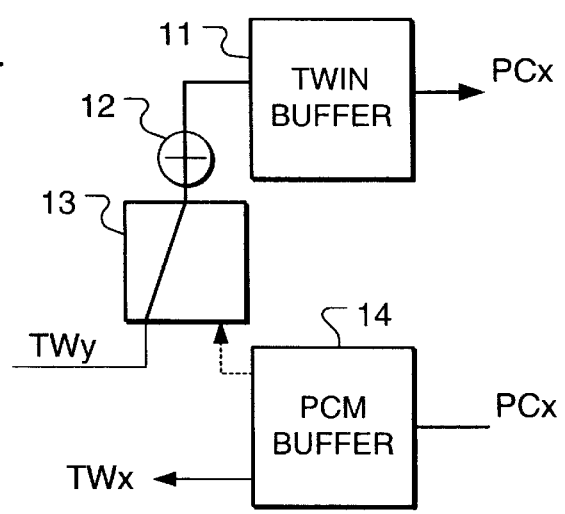

FIG. 6c represents a simple communication between a module on the bus and an external telephone line (two channels are used).

Figure 6D:
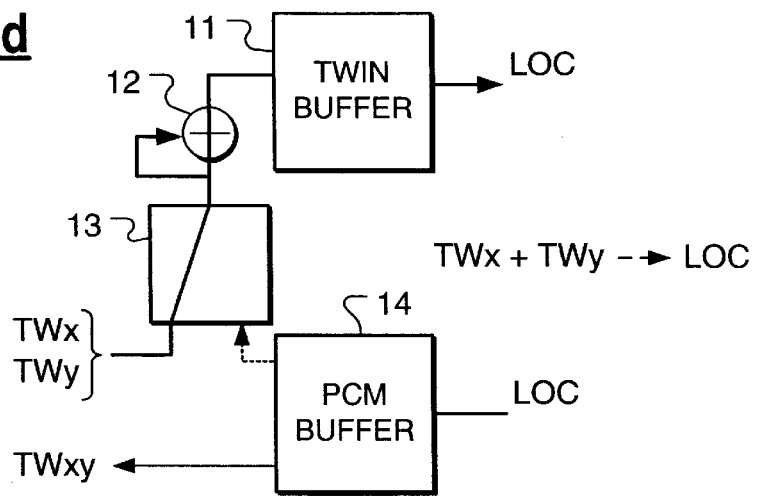

FIG. 6d represents a conference between the local module and two modules on the bus (three channels are used).

Figure 6E:
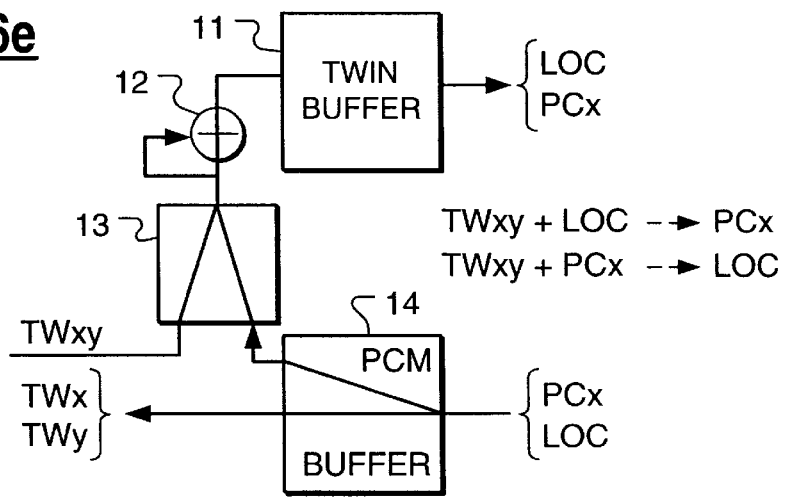

FIG. 6e represents a conference between the local module, a module on the bus and an external telephone line (three channels are used).

Figure 6F:
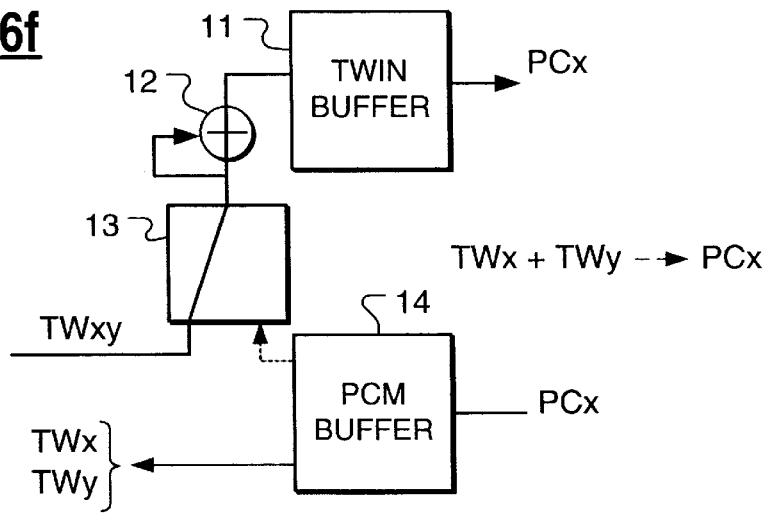

FIG. 6f represents a conference between an external telephone line and two modules on the bus (three channels are used).

Figure 6G:
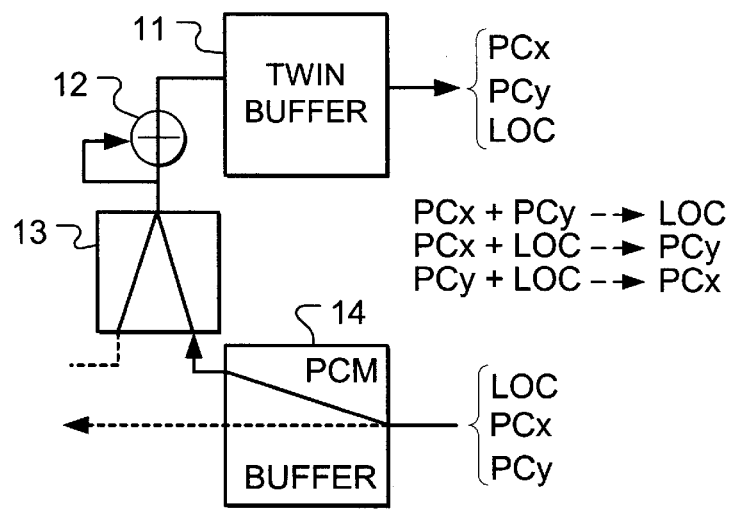

FIG. 6g represents a conference between the local module and two external telephone lines (no channels on the bus are used).

Figure 6H:
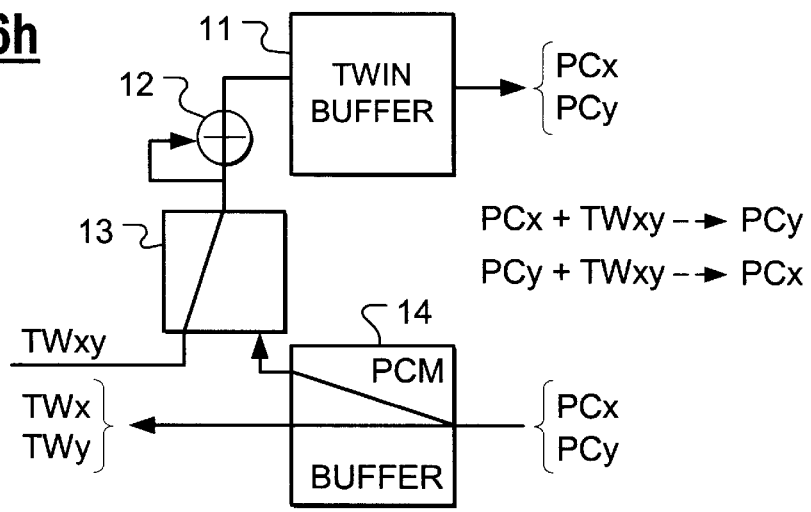

FIG. 6h represents a conference between two external telephone lines and a module on the bus (three channels are used).

Figure 6I:
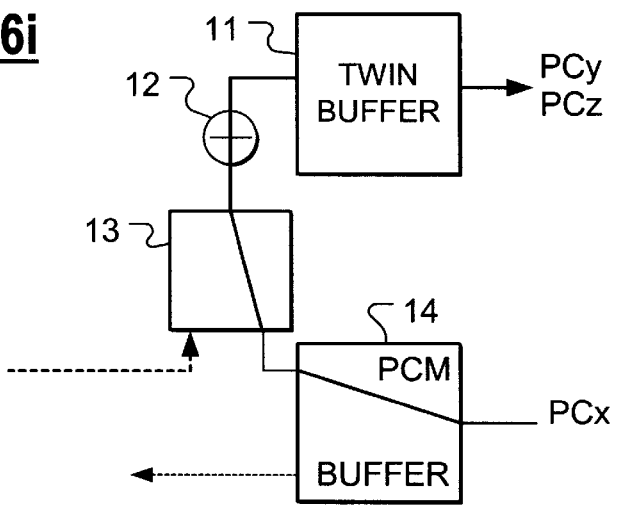

FIG. 6i represents a PCM input channel that transmits directly to two PCM output channels (no channels on the bus are used for music). For instance, PCx for music, PCy= SYS1 and PCz=SYS2.

To be noted that only five cases exist for the conference since a terminal may carry out conference operations for itself or its external telephone line and additions towards the line interface are not carried out.

These additions at most can be carried out in a frame: one for the local module and two for the telephone line interface.

In order to avoid the addition of too many registers for carrying out additions, the following policy has been adopted. The adder buffer is a destination for the channels on the bus similar to any TWIN buffer. All the channels pass through the adder. When the word to be passed shall not be summed, the input of the buffer is masked. When the word to be passed is a not stored operand, the operation is carried out at once when it arrives and the result is stored into a register of the TWIN buffer. The programming of the switching module 2 must give the following informations.

For every possible PCM channel it is necessary to know the source and the destination, and for every possible PCM channel involved in a conference it is necessary to know the two sources and whether the communications come from the bus or from the PCM connection.

The watch dog module 4 is so constructed that the software must access a low-speed dummy buffer so that the hardware is supposed not locked in a bad condition. Otherwise a counter, that takes the synchronism from the system, starts the reset of the microprocessor. The time requested for resetting the microprocessor is programmed through a 0 to 448 ms counter in steps of 32 ms. The microprocessor 6 handles the information to be able to drive the interface 3 and the modules 2, 4 and 5.

There is also a minimum hardware protection to avoid conflicts on the bus. Such protection exists to avoid that a module which is not locked on a frame is capable of transmitting over the bus.

When the system is operating (i.e. when an SOS exists and when all the other modules are locked to the frame) there is no way to block a module that will try to overwrite and occupy a channel. This is true for any channel either a data or a signaling one. The method of transmitting signalings over the bus is such that it is possible to signal the occupation of the signalling channel during the following frame. If the module is not selected by the SOS (i.e. if the authorization number of the signalling channel is not equal to the module identification number) this function is disabled.

The circuits implementing the various blocks forming the interface module will not be described in detail since a person skilled in the art will understand and realize them without any difficulty. In particular, from the foregoing description one can deduce all the functional aspects necessary for the circuit implementation.

In a special and advantageous embodiment, the invention, with the exception of the microprocessor, has been implemented through a unique Application Specific Integrated Circuit (ASIC). In this manner, besides having the advantages deriving from a modular structure of the apparatus, a significant reduction in the dimension of the interface modules is also obtained, to such an extent that it can be inserted even e.g. in a subset.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Private digital communication apparatus comprising a plurality of interface modules for communicating through a common bus, means for managing access of said interface modules to said common bus, said means for managing access being partially distributed in each of said interface modules, wherein said interface modules each comprises: a line interface (1) connected to said bus, a PCM interface (3), a switching module (2) connected to said line interface (1) and said PCM interface (3), an access control module (5) for driving said line interface (1), a microprocessor (6) for driving said switching module (2), said PCM interface (3) and said access control module (5), wherein said switching module includes buffers for storing bidirectional data transmitted between said bus and a network outside said private digital communication apparatus and a switch for routing signals between said buffers or between said network outside said private digital communication apparatus and said buffers, wherein said switching module includes a switch and an adder for establishing a communication between two of said interface modules or between one of said modules and an external telephone line, and for establishing a conference between one or more external telephone lines and one of said modules or between one or more of said modules and an external telephone line.

2. Communication apparatus according to claim 1, wherein each of said interface modules may become a master manager of said bus.

3. Communication apparatus according to claim 1, wherein said common bus is a bidirectional two-wire bus.

4. Communication apparatus according to claim 1, wherein said common bus is carried out through a time division multiple access technique.

5. Communication apparatus according to claim 1, wherein said interface modules have a PCM interface in order to be able to make an outside connection.

6. Communication apparatus according to claim 1, further comprising a watch dog module (4) connected to said bus and driven by said microprocessor (6).

7. Integrated circuit comprising a line interface (1) connected to a bus, a PCM interface (3), a switching module (2) connected to said line interface (1) and to said PCM interface (3), an access control module (5) for controlling said line interface (1), and a microprocessor (6) for controlling said switching module (2), said PCM interface (3) and said access control module (5), wherein the switching module (2) is able to route channels from the line interface (1) to the PCM interface (3) and also provides for connection between plural channels of the PCM interface (3) as well as for providing a signal from the microprocessor (6) in substitution for one of the plural channels, wherein the switching module (2) includes a switch and an adder for establishing a simple communication between two of said interface modules or between one of said modules and an external telephone line, and for establishing a conference between one or more external telephone lines and one of said modules or between one or more of said modules and an external telephone line.

8. Private digital communication apparatus comprising a plurality of interface modules for communicating through a common bus, and means for managing access of said interface modules to said common bus, said means for managing access being partially distributed in each of said interface modules, wherein each of said interface modules may become a master manager of said bus, wherein each of said interface modules includes a switch (13) and an adder (12) for establishing a communication by switching and adding signals between two of said interface modules, and also between one or more of said modules and an external telephone line or between one or more external telephone lines and one of said modules, and wherein said interface modules have a PCM interface in order to be able to make an outside connection.

9. Private digital communication apparatus comprising a plurality of interface modules for communicating through a common bus, and means for managing access of said interface modules to said common bus, said means for managing access being partially distributed in each of said interface modules, wherein each of said interface modules may become a master manager of said bus, wherein each of said interface modules includes a switch (13) and an adder (12) for establishing a communication by switching and adding signals between two of said interface modules, and also between one or more of said modules and an external telephone line or between one or more external telephone lines and one of said modules, and wherein said interface modules each comprises: a line interface (1) connected to said bus, a PCM interface (3), a switching module (2) connected to said line interface (1) and said PCM interface (3), an access control module (5) for driving said line interface (1), a microprocessor (6) for driving said switching module (2), said PCM interface (3) and said access control module (5).

10. Private digital communication apparatus comprising a plurality of interface modules for communicating through a common bus, and means for managing access of said interface modules to said common bus, said means for managing access being partially distributed in each of said interface modules, and further comprising a watch dog module (4) connected to said bus and driven by said microprocessor (6), wherein each of said interface modules may become a master manager of said bus, and wherein each of said interface modules includes a switch (13) and an adder (12) for establishing a communication by switching and adding signals between two of said interface modules, and also between one or more of said modules and an external telephone line or between one or more external telephone lines and one of said modules.

11. Private digital communication apparatus comprising a plurality of interface modules for communicating through a common bus, means for managing access of said interface modules to said common bus, said means for managing access being partially distributed in each of said interface modules, wherein said interface modules each comprises: a line interface (1) connected to said bus, a PCM interface (3), a switching module (2) connected to said line interface (1) and said PCM interface (3), an access control module (5) for driving said line interface (1), a microprocessor (6) for driving said switching module (2), said PCM interface (3) and said access control module (5), wherein said switching module includes a switch (13) and an adder (12) for establishing a communication by switching and adding signals between two of said interface modules, and also between one of said modules and an external telephone line or between one or more external telephone lines and one of said modules.

12. Integrated circuit for use in an interface module, said integrated circuit comprising a line interface (1) connected to a bus, a PCM interface (3), a switching module (2) connected to said line interface (1) and to said PCM interface (3), an access control module (5) for controlling said line interface (1), and a microprocessor (6) for controlling said switching module (2), said PCM interface (3) and said access control module (5), wherein the switching module (2) includes a switch (13) and an adder (12) for establishing a communication by switching and adding signals between two of said interface modules, and also between one or more of said modules and an external telephone line or between one or more external telephone lines and one of said modules.

* * * * *

UNITED STATES PATENT AND TRADEMARK OFFICE
CERTIFICATE OF CORRECTION

PATENT NO. : 6,275,474 B1
DATED : August 14, 2001
INVENTOR(S) : Perin et al.

It is certified that error appears in the above-identified patent and that said Letters Patent is hereby corrected as shown below:

Claims,
Please delete claims 1 and 7 and substitute the following amended claims 1 and 7 therefor:

-- 1. Private digital communication apparatus comprising a plurality of interface modules for communicating through a common bus, means for managing access of said interface modules to said common bus, said means for managing access being partially distributed in each of said interface modules, wherein said interface modules each comprises: a line interface (1) connected to said bus, a PCM interface (3), a switching module (2) connected to said line interface (1) and said PCM interface (3), an access control module (5) for driving said line interface (1), a microprocessor (6) for driving said switching module (2), said PCM interface (3) and said access control module (5), wherein said switching module includes buffers for storing bidirectional data transmitted between said bus and a network outside said private digital communication apparatus and a switch for routing signals between said buffers or between said network outside said private digital communication apparatus and said buffers, wherein said switching module includes a switch and an adder for establishing a communication by switching and adding signals between two of said interface modules, between one of said modules and an external telephone line, or between one or more external telephone lines and one of said modules. --

-- 7. Integrated circuit comprising a line interface (1) connected to a bus, a PCM interface (3), a switching module (2) connected to said line interface (1) and to said PCM interface (3), an access control module (5) for controlling said line interface (1), and a microprocessor (6) for controlling said switching module (2), said PCM interface (3) and said access control module (5), wherein the switching module (2) is able to route channels from the line interface (1) to the PCM interface (3) and also provides for connection between plural channels of the PCM interface (3) as well as for providing a signal from

UNITED STATES PATENT AND TRADEMARK OFFICE
CERTIFICATE OF CORRECTION

PATENT NO.   : 6,275,474 B1
DATED        : August 14, 2001
INVENTOR(S)  : Perin et al.

It is certified that error appears in the above-identified patent and that said Letters Patent is hereby corrected as shown below:

the microprocessor (6) in substitution for one of the plural channels, wherein the switching module (2) includes a switch and an adder for establishing a communication by switching and adding signals between two of said interface modules, between one of said modules and an external telephone line, or between one or more external telephone lines and one of said modules. --

Signed and Sealed this

Ninth Day of April, 2002

Attest:

JAMES E. ROGAN
*Attesting Officer*     *Director of the United States Patent and Trademark Office*